(12) United States Patent
Shah et al.

(10) Patent No.: US 7,500,242 B2
(45) Date of Patent: Mar. 3, 2009

(54) LOW-CONTENTION LOCK

(75) Inventors: Sanjiv M. Shah, Champaign, IL (US);
Paul M. Petersen, Champaign, IL (US);
Grant E. Haab, Mahomet, IL (US)

(73) Assignee: Intel Corporation, Santa Clara, CA (US)

( * ) Notice: Subject to any disclaimer, the term of this patent is extended or adjusted under 35 U.S.C. 154(b) by 844 days.

(21) Appl. No.: 10/658,626

(22) Filed: Sep. 8, 2003

(65) Prior Publication Data
US 2005/0055593 A1   Mar. 10, 2005

(51) Int. Cl.
| G06F 9/46 | (2006.01) |
| G06F 12/00 | (2006.01) |
| G06F 12/14 | (2006.01) |
| G06F 13/14 | (2006.01) |
| G06F 13/00 | (2006.01) |
| G06F 13/28 | (2006.01) |

(52) U.S. Cl. ................ 718/104; 710/200; 710/240; 711/150; 711/151

(58) Field of Classification Search ................. 713/200; 718/105, 104; 707/8; 710/200, 240; 711/150–151; 709/225
See application file for complete search history.

(56) References Cited

U.S. PATENT DOCUMENTS

| 4,604,694 A | 8/1986 | Hough et al. |
| 6,237,019 B1 | 5/2001 | Ault et al. |
| 6,314,563 B1 | 11/2001 | Agesen et al. |
| 6,510,478 B1 | 1/2003 | Jeffords et al. |
| 6,578,033 B1 * | 6/2003 | Singhal et al. ................ 707/8 |
| 7,017,160 B2 * | 3/2006 | Martin et al. ............... 719/315 |
| 2001/0032281 A1 | 10/2001 | Daynes |
| 2001/0047361 A1 | 11/2001 | Martin et al. |
| 2003/0200457 A1 * | 10/2003 | Auslander et al. ........... 713/200 |

FOREIGN PATENT DOCUMENTS

EP   0 807 884   11/1997

OTHER PUBLICATIONS

Johnson et al., "A simple correctness proof of the MCS contention-free lock", 1993, ACM, pp. 1-6.*
K. Hwang et al., "Computer Architecture and Parallel Processing", Chapter 8, pp. 557-562, McGraw-Hill, 1985.
M. Herlihy, "A Methodology for Implementing Highly Concurrent Data Objects", 2nd ACM SIGPLAN Symp. on Principles & Practice of Parallel Programming, pp. 197-206, 1990.
J. Stone, "A Simple and Correct Shared-Queue Algorithm using Compare-and-Swap", Proc. of Supercomputing '90, pp. 495-504, 1990.
J. Mello-Crummey et al., "Algorithms for Scalable Synchronization on Shared-Memory Multiprocessors", ACM Transaction on Computer Systems, 9:21-65;. Feb. 1991.

(Continued)

*Primary Examiner*—Meng-Ai An
*Assistant Examiner*—Qing-Yuan Wu
(74) *Attorney, Agent, or Firm*—Schwabe, Williamson & Wyatt, P.C.

(57) ABSTRACT

The present disclosure relates to acquiring and releasing a shared resource via a lock semaphore and, more particularly, to acquiring and releasing a shared resource via a lock semaphore utilizing a state machine.

44 Claims, 5 Drawing Sheets

OTHER PUBLICATIONS

R Anderson et al., "Wait-free Parallel Algorithms for the Union-Find Problem", Proc. of the 23rd ACM Symp. on Theory Computation, pp. 370-380, 1991.

S. Prakash et al., "A Non-Blocking Algorithm for Shared Queues using Compare-and-Swap", Proc. 1991 International Conf. on Parallel Processing, vol. 2, pp. 68-75, 1991.

J. Valois, "Implementing Lock-Free Queues", Proc. on the 7th International Conf. on Parallel & Distributed Computing Systems, Las Vegas, NV, Oct. 1994.

D. Bacon et al., "Thin Locks: Featherweight Synchronization for Java", Proc. of the ACM Conf. on Programming Language Design & Implementation, vol. 33, No. 6, Jun. 1998.

A. Schiper, "Distributed Algorithms", 7th International Workshop, WDAG '93, Lausanne, Switzerland, Sep. 27-29, 1993, proceedings.

PCT/US2004/029276 Int'l Preliminary Report on Patentability dated Mar. 23, 2006.

PCT Search report and written opinion.

\* cited by examiner

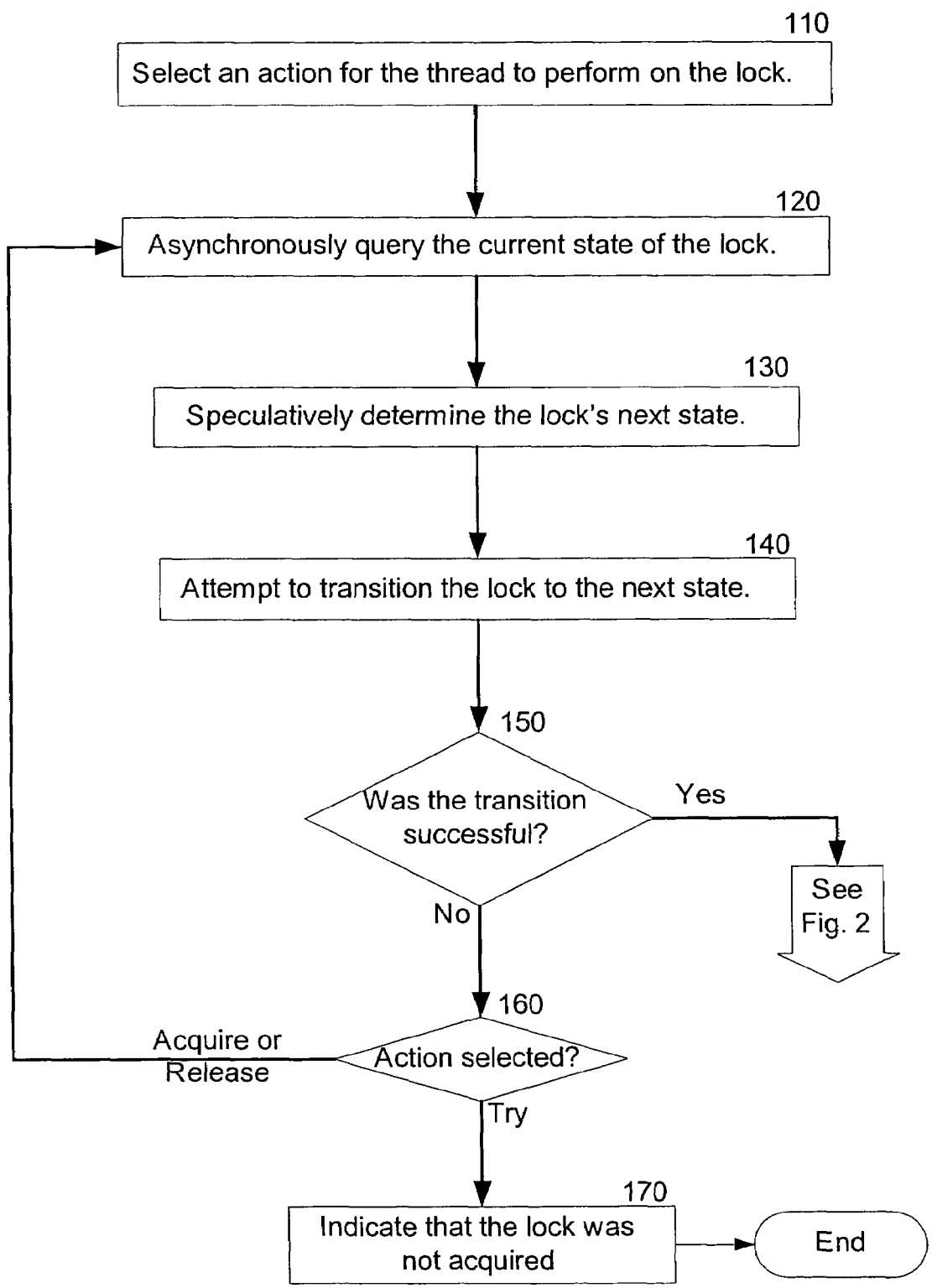

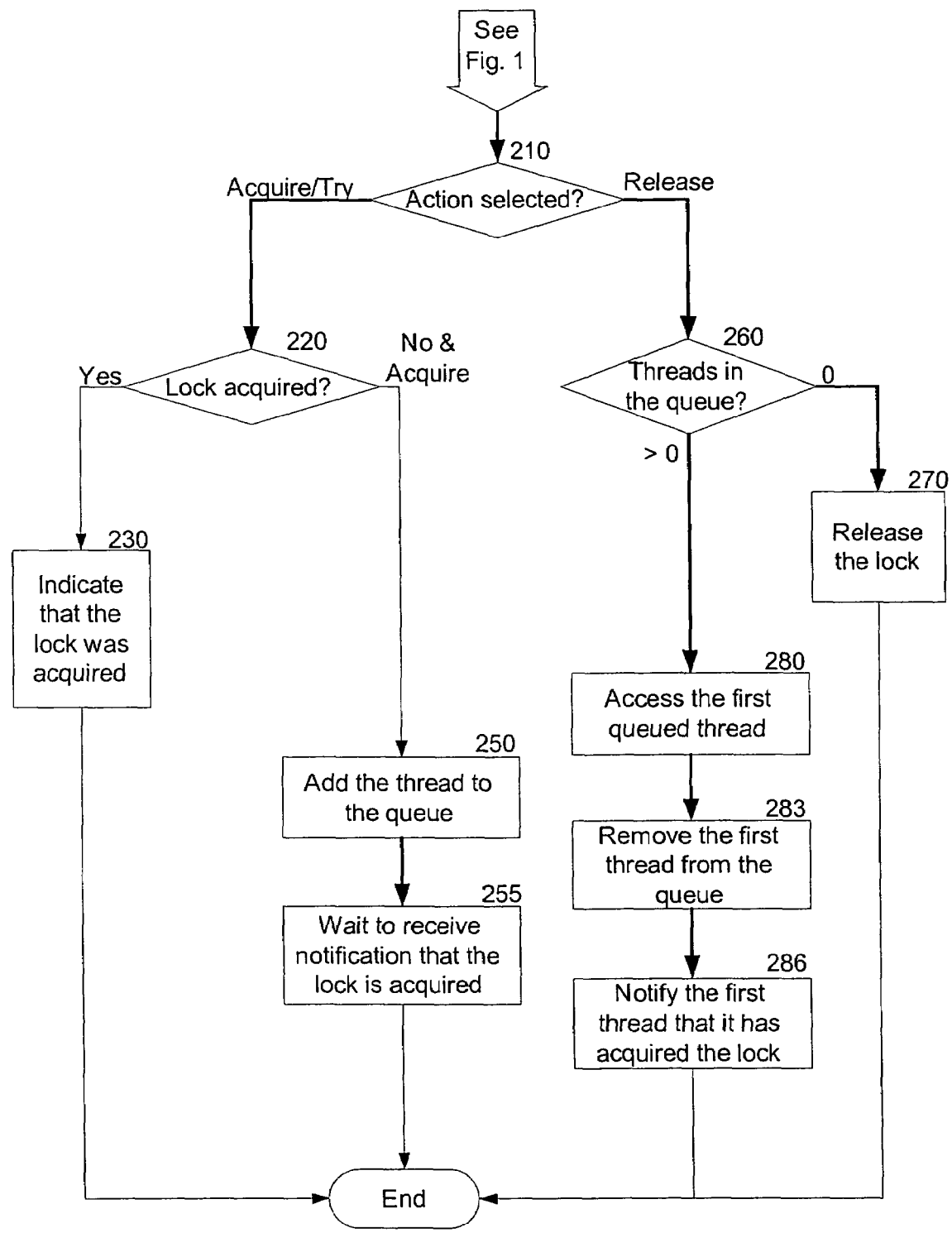

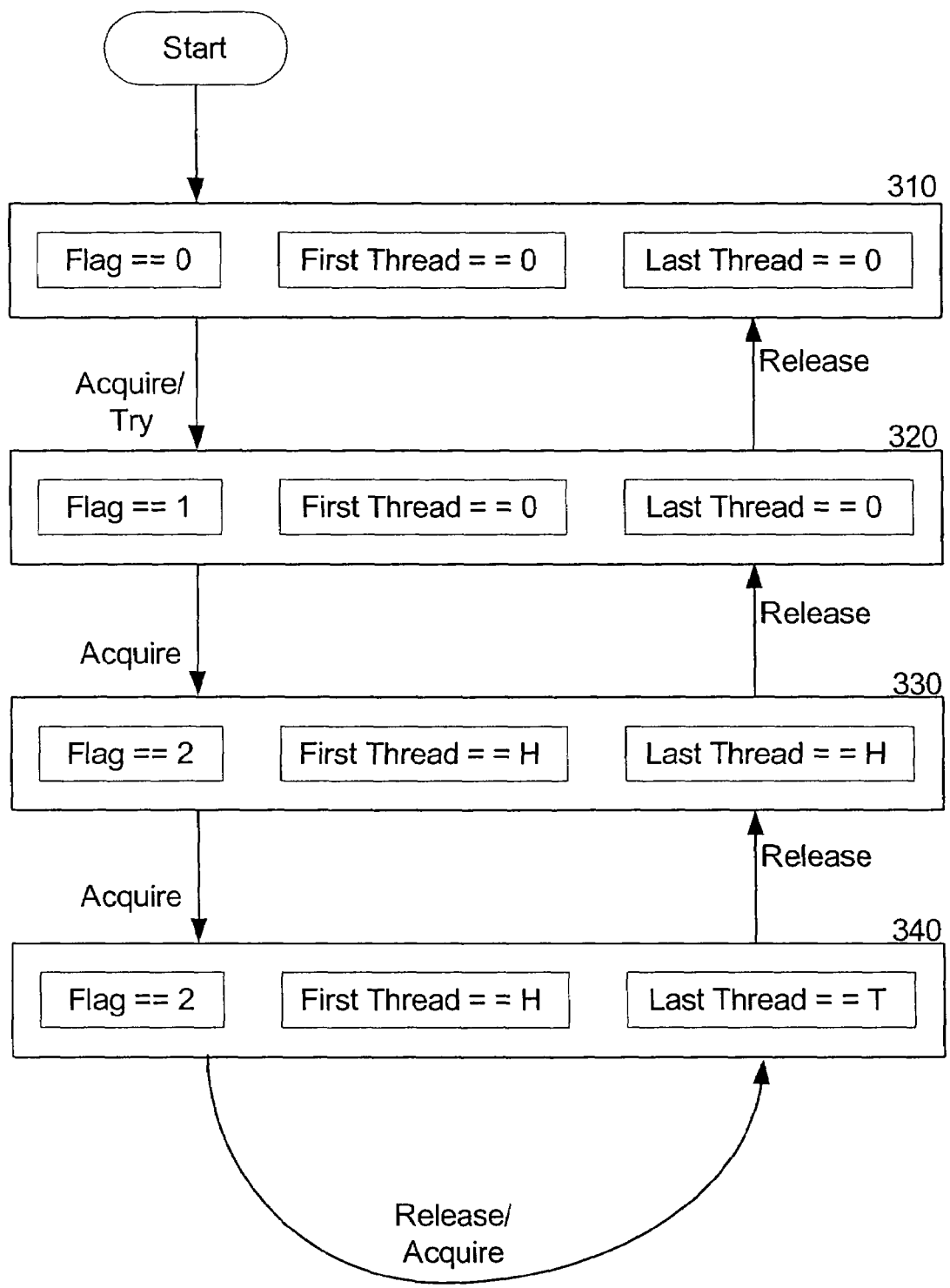

Fig. 4

| | State | | | Meaning |
|---|---|---|---|---|
| | Flag | First Thread | Last Thread | |
| 410 | 0 | 0 | 0 | No thread holds the lock. No thread is in the queue to acquire the lock. |
| 420 | 1 | 0 | 0 | The lock is held. No thread is in the queue to acquire the lock. |
| 430 | 2 | H | H | The lock is held. One thread is in the queue to acquire the lock. "H" is an identifier to one thread in the queue. |
| 440 | 2 | H | T | The lock is held. At least two threads are in the queue to acquire the lock. "H" is an identifier to first thread in the queue (a.k.a. the "head" thread). "T" is an identifier to last thread in the queue (a.k.a. the "tail" thread). |

LOW-CONTENTION LOCK

BACKGROUND

1. Field

The present disclosure relates to acquiring and releasing a shared resource via a lock semaphore and, more particularly, to acquiring and releasing a shared resource via a lock semaphore utilizing a state machine.

2. Background Information

Typically, processing or computer systems allow multiple programs to execute substantially simultaneously. Multiple programs may execute substantially simultaneously utilizing techniques such as, for example, time slicing, parallel execution or multiple processing engines. Furthermore, it is possible for multiple parts of a program, or threads, to execute substantially simultaneously in much the same manner. Techniques that allow for this substantially simultaneous execution are often referred to as being multi-tasking, multi-threading or hyper-threading. An example of a multi-tasking technique may allow for a music player and a word processor to be run substantially simultaneously, so a user could listen to music while they write a document. An example of a multi-threading technique may be a word processor that allowed editing of a document while simultaneously printing the same document.

These threads, processes, or programs, hereafter, collectively referred to as "threads," often access shared resources. These shared resources may include physical hardware or other sections of executable instructions, such as, for example, a common library. These shared resources may not be capable of being substantially simultaneously utilized by multiple threads. For example, it is not common for a printer to print two or more documents simultaneously; however, in a multi-threaded environment two or more threads may attempt to simultaneously print to the printer. Of course, this is merely one example of a shared resource that may be incapable of being substantially simultaneously utilized by multiple threads.

To prevent errors or other undesirable effects that may occur when multiple threads attempt to simultaneously use a shared resource a variety of techniques are known. In one technique, thread access to a shared resource may be governed by a semaphore lock, hereafter, "lock." In this context, a lock is a signal or a flag variable used to govern access to shared system resources. A lock often indicates to other potential users or threads that a file or other resource is in use and prevents access by more than one user or thread.

In the printer example above, a first thread may acquire a lock on the printer, print the document, and release the lock on the printer. The second thread may attempt to acquire the printer's lock. Upon finding the printer is already locked by the first thread, the second thread often waits to acquire the lock. When the first thread releases the printer lock, the second thread may then acquire the printer lock, print the second document, and release the lock on the printer. In this example, contention for access to the printer is governed.

Often it is possible for a single thread to hold multiple locks at a given time. Using traditional techniques, when a thread holds multiple locks at the same time, the associated dynamic memory allocation and deallocation is often proportional to the sum of the number of locks, the number of threads, and the number of lock acquisitions. In modem systems, this resulting number is often quite large. In addition, frequent memory allocations and dealloctions may consume a large amount of processing time and other system resources. A need, therefore, exists for an improved system or technique for implementing the acquiring and releasing of a shared resource via a lock semaphore.

BRIEF DESCRIPTION OF THE DRAWINGS

Subject matter is particularly pointed out and distinctly claimed in the concluding portions of the specification. The disclosed subject matter, however, both as to organization and the method of operation, together with objects, features and advantages thereof, may be best understood by a reference to the following detailed description when read with the accompanying drawings in which:

FIG. 1 is a flowchart illustrating an embodiment of a technique for acquiring and/or releasing a lock in accordance with the disclosed subject matter;

FIG. 2 is a flowchart illustrating an embodiment of a technique for acquiring and/or releasing a lock in accordance with the disclosed subject matter;

FIG. 3 is a state diagram illustrating an embodiment of a state machine utilized by a technique for acquiring and/or releasing a lock in accordance with the disclosed subject matter;

FIG. 4 is a table detailing the possible states of a state machine utilized within an embodiment of a technique for acquiring and/or releasing a lock in accordance with the disclosed subject matter.

DETAILED DESCRIPTION

Figure 5:
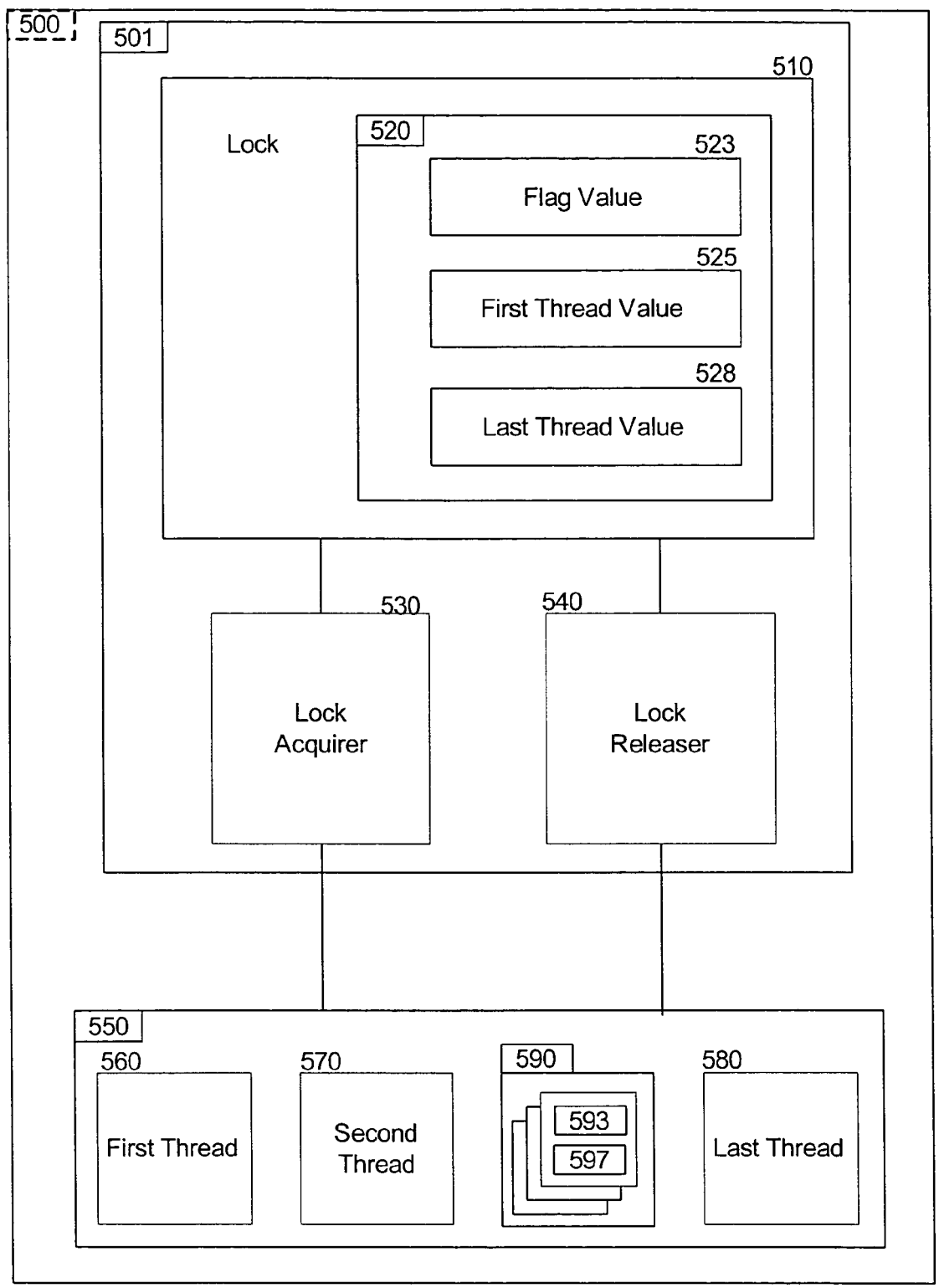
FIG. 5 is a block diagram illustrating an embodiment of an apparatus and a system that allows for acquisition and release of a lock in accordance with the disclosed subject matter.

In the following detailed description, numerous details are set forth in order to provide a thorough understanding of the present disclosed subject matter. However, it will be understood by those skilled in the art that the disclosed subject matter may be practiced without these specific details. In other instances, well-known methods, procedures, components, and circuits have not been described in detail so as not to obscure the disclosed subject matter.

FIG. 1 is a flowchart illustrating an embodiment of a technique for acquiring and/or releasing a lock in accordance with the disclosed subject matter. Block 110 illustrates that a requesting thread, or agent associated with the thread, may select an action to perform upon the lock. In one embodiment, the action may be selected from a group of actions including: acquiring the lock, trying to acquire the lock, or releasing the lock.

Block 120 illustrates that the current state of the lock may be asynchronously queried. In one embodiment, the lock may utilize a state machine with four valid states, such as, for example the state machine shown in FIG. 3.

FIG. 3 is a state diagram illustrating an embodiment of a state machine utilized by a technique for acquiring and/or releasing a lock in accordance with the disclosed subject matter. One embodiment of the state machine may include four valid states. The embodiment may also involve a lock that includes a flag value, a pointer to a first thread in a queue of threads waiting to acquire the lock, and a pointer to a last thread in the queue to acquire the lock. In one embodiment, the flag value may indicate both whether or not the lock is being held and if there is a queue of threads waiting to acquire the lock. In other embodiments, the flag value may only indicate whether or not the lock is being held, and another value may indicate if a queue exists. It is also contemplated that the existence of the queue may be determined by the first and last thread pointers. It is further contemplated that the "pointer" to the threads may be an address value, a unique thread identifier or some other value that would facilitate access to the threads. In the embodiments illustrated by FIGS. 3 and 4, the state of the lock may be determined by the flag value and thread pointers; however, other techniques for determining the lock state are contemplated.

State 310 may indicate that no thread holds the lock and there are no threads waiting in a queue to acquire the lock. In the illustrated embodiment, the flag value, the first thread pointer, and the last thread pointer may all be set to zero. However, it is contemplated that other values may be used in other embodiments to represent this un-acquired state. In this embodiment, state 310 may be the initial state of the lock. Also in this embodiment, the lock, since it is not held, may not be released. In one embodiment, an attempt to release the lock may result in an error. Furthermore, in this embodiment, the lock may only be acquired (via either an acquire or try action). The act of acquiring the lock may move the lock to state 320. However, other embodiments are contemplated.

State 320 may indicate that a thread holds the lock and no threads are waiting in the queue. In the illustrated embodiment, the flag value may be set to one, and the first and last thread pointers may be set to zero. However, it is contemplated that other values may be used in other embodiments to represent this acquired state. In this embodiment, if the lock is released, the lock may return to state 310. Also, in this embodiment, if the lock is acquired, the lock may move to state 330. However, other embodiments are contemplated.

State 330 may indicate that a thread holds the lock and one thread is waiting in the queue. In the illustrated embodiment, the flag value may be set to two, and the first and last thread pointers may point to the same thread. This thread is represented in FIGS. 3 & 4 as "H" which stands for the thread at the head of the queue. However, it is contemplated that other values may be used in other embodiments to represent this state. In this embodiment, if the lock is released, the lock may return to state 320. Also, in this embodiment, if the lock is acquired, the lock may move to state 340. However, other embodiments are contemplated.

State 340 may indicate that a thread holds the lock and that more than one thread is waiting in the queue. In the illustrated embodiment, the flag value may be set to two, and the first and last thread pointers may point to the different threads. The last thread is represented in FIGS. 3 & 4 as "T" which stands for the thread at the tail of the queue. However, it is contemplated that other values may be used in other embodiments to represent this state. In this embodiment, if the lock is released, the lock may return to either state 330 or remain at state 340, depending upon whether releasing the lock changes the queue length to one. Also, in this embodiment, if the lock is acquired, the lock may remain at state 340. It is contemplated that when the lock remains at state 340 after a release or acquire action, that either the first or last thread pointer may be changed to represent the performed action. However, other embodiments are contemplated.

FIG. 4 is a table detailing the possible states of a state machine utilized within an embodiment of a technique for acquiring and/or releasing a lock in accordance with the disclosed subject matter. It provides a summary of the state machine illustrated in FIG. 3. Row 410 summarizes state 310. Row 420 summarizes state 320. Row 430 summarizes state 330. Row 440 summarizes state 340. However, FIGS. 3 & 4 merely illustrate one embodiment of the disclosed subject matter and other embodiments are contemplated.

Returning to FIG. 1, block 130 illustrates that once the current state of the lock has been determined, in block 120, the lock's next state may be speculatively determined. In one illustrative example, the thread may request that the lock be acquired. The current state of the lock may show that the lock is not presently held. Therefore, utilizing the embodiment of the state machine illustrated by FIG. 3, the next state of the lock, after the requested "acquire" action is performed, may be speculatively determined to be a state that represents the lock being held, but having no threads in a queue waiting to acquire the lock.

Block 140 illustrates that an attempt to transition the lock to the next state may be made. It is contemplated that this, and possibly any, alteration of the lock's state may be done via a technique that attempts to minimize the occurrence of race conditions and other undesirable thread related effects. A race condition is often defined as an undesirable situation that occurs when a device or system attempts to perform two or more operations at substantially the same time, but because of the nature of the device or system, the operations must be done in the proper sequence in order to be done correctly. In one embodiment, the alteration may be performed by a "compare-and-store" operation (a.k.a. a "test-and-set" operation) that confirms that a variable is equal to an expected value before allowing the variable to be set to a new value. However, these are merely a few non-limiting examples to which the disclosed subject matter is not limited by.

Block 150 illustrates that the state transition may not be, in some embodiments, successful. It is contemplated that, in one embodiment, the state of the lock may change between block 120 and block 140. It is also contemplated that the thread or performer of the technique may not be aware of this change in state before the transition is attempted. In one illustrative example, a second thread may alter the state of the lock between blocks 120 and 140. This may cause the attempted state transition to fail. It is contemplated that transition may fail if such a change, for example, has occurred. However, other possible failures are contemplated.

Block 160 illustrates that, if the state transition of block 140 failed, the selected action may be examined. The selected or requested action of block 110 may be, in one embodiment: try to acquire the lock, acquire the lock, or release the lock. However, other actions are within the scope of the disclosed subject matter.

Block 170 illustrates that, in one embodiment, if the selected action was to merely try to acquire the lock and the state transition failed, the technique may indicate to the requesting thread that the lock was not acquired. Conversely, in one embodiment, if the selected action was "acquire" or "release," FIG. 1 illustrates that the technique may repeat blocks 120, 130, and 140, until the lock has successfully transitioned state.

FIG. 2 is a flowchart illustrating an embodiment of a technique for acquiring and/or releasing a lock in accordance with the disclosed subject matter. FIG. 2 is an extension of FIG. 1 that details an embodiment of a technique that may be employed if the state transition of block 140 of FIG. 1 is successful.

Block 210 of FIG. 2 illustrates that different events may transpire depending upon the action selected (see block 110 of FIG. 1). If the selected action was "acquire" or "try," block 220 illustrates that different actions may be performed based upon whether or not the lock was acquired. In one illustrative embodiment, acquiring the lock may be synonymous with transitioning the lock into state 310 of FIG. 3. However, this is merely one illustrative embodiment, and other embodiments are contemplated.

Block 230 illustrates, if the lock was acquired, that an indication that the lock was acquired may be made to the thread. In one embodiment, this indication may include deselecting (or setting to the "false" state) a spin flag in the thread. This spin flag may have prevented execution of the thread while it waited on the acquisition of the lock. However, it is contemplated that other forms of indication are possible and that this is merely one illustrative example. It is also contemplated that the indication may only be made in certain embodiments of the disclosed subject matter.

Block 250 illustrates that, if the lock was not acquired and the selected action was "acquire," the thread requesting the lock may be added to a queue of threads waiting to acquire the lock. In one embodiment, the thread may simply be added to the end or tail of the queue. However, it is contemplated that other schemes may be used to prioritize access to the lock.

In one illustrative embodiment, the added thread may be the first and only thread in the queue. For example, the lock may be transitioned from state 320 of FIG. 3 to state 330. In this case, adding the thread to the queue may include setting the flag value of the lock to two, and placing a pointer (or some other value to facilitate access) to the thread in the first and last thread pointer values of the lock. However, this is merely one highly specific embodiment of the disclosed subject matter and other embodiments are contemplated.

In a second illustrative embodiment, the added thread may be the second thread in the queue. For example, the lock may be transitioned from state 330 to state 340. In this case, adding the thread to the queue may include not changing the flag value or the first thread pointer of the lock, and placing a pointer (or some other value to facilitate access) to the thread in the last thread pointer value of the lock. However, this is merely one highly specific embodiment of the disclosed subject matter and other embodiments are contemplated.

In a third illustrative embodiment, the added thread may be the third or higher thread in the queue. For example, the lock may be transitioned from a previous state 340 to new state 340. In this case, adding the thread to the queue may include not changing the flag value or the first thread pointer of the lock, but placing a pointer (or some other value to facilitate access) to the thread in the last thread pointer value of the lock. This new last (or "tail") thread pointer would replace the previous last thread pointer. However, this is merely one highly specific embodiment of the disclosed subject matter and other embodiments are contemplated.

Block 255 of FIG. 2 illustrates that the now queued thread may wait to receive notification that the lock is acquired. It is contemplated that in one embodiment, the thread may await notification that the lock is available to be acquired. In one embodiment, the thread may be prevented from executing while waiting. In another embodiment the thread may continue to execute a portion of the thread that does not need or desire access to the resource controlled by the lock.

Block 260 illustrates that, if the selected action was to release the lock, the number of threads in or, in another embodiment, the existence of a queue of threads waiting to acquire the lock may be determined. In one embodiment, the approximate size of the queue may be determined by a flag value associated with the lock. In another embodiment, the existence or depth of the queue may be determined by comparing the first and last queued thread pointers. However, these are merely two illustrative examples and it is contemplated that other schemes for determining the existence or depth of a queue may be used.

Block 270 illustrates that if no queue exists, the lock may be released. In one embodiment, illustrated by FIG. 3, this may involve transitioning the lock from state 320 to state 310. In this embodiment, block 270 of FIG. 2 may be synonymous with block 140 of FIG. 1. However, it is contemplated that other embodiments may include a more involved releasing mechanism, such as for example, a pre-defined return value or centralized status mechanism. These are merely a few non-limiting embodiments.

Block 280 of FIG. 2 illustrates that if a queue does exist, the first thread in the queue may be identified or accessed. In one embodiment, this may involve utilizing the pointer value associated with the first thread pointer value of the lock. However, this is merely one illustrative embodiments and other embodiments are contemplated.

Block 283 illustrates that the first thread may be removed from the queue. In one embodiment this may include editing both the state of the lock and the de-queued thread. However, other schemes for de-queuing the thread are contemplated. Three highly specific embodiments are described below; however, these are merely a few non-limiting examples.

In one illustrative embodiment, the de-queued thread may be the first and only thread in the queue. For example, the lock may be transitioned from state 330 of FIG. 3 to state 320. In this case, removing the thread from the queue may include setting the flag value of the lock to one, and setting the first and last thread pointer values to zero. However, this is merely one highly specific embodiment of the disclosed subject matter and other embodiments are contemplated.

In a second illustrative embodiment, the queue may only include two threads. For example, the lock may be transitioned from state 340 to state 330. In this case, removing the thread from the queue may include not changing the flag value or the last thread pointer of the lock, while placing a pointer (or some other value to facilitate access) to the second queued thread in the first thread pointer value of the lock. In one embodiment, the first thread may include a "next thread" value that includes a pointer to the next thread in the queue. This next thread value may be accessed to determine the proper value to set the new first thread pointer in the lock. However, this is merely one highly specific embodiment of the disclosed subject matter and other embodiments are contemplated.

In a third illustrative embodiment, the queue may include more than two threads. For example, the lock may be transitioned from a previous state 340 to a new state 340. In this embodiment the actions may be identical to the second illustrative embodiment. Unlike the second embodiment, where the first and last thread pointers ultimately contained the same value in state 330, this embodiment would result in the first and last thread pointers containing different values in state 340. However, this is merely one highly specific embodiment of the disclosed subject matter and other embodiments are contemplated.

Block 286 of FIG. 2 illustrates that the de-queued thread may be notified that it has acquired the lock. In one embodiment, this indication may include deselecting (or setting to the "false" state) a spin flag in the thread. This spin flag may have prevented execution of the thread while it waited on the acquisition of the lock. However, it is contemplated that other forms of indication are possible and that this is merely one illustrative example. It is also contemplated that the indication may only be made in certain embodiments of the disclosed subject matter.

It is also contemplated that in one embodiment, some, if not all, of the actions illustrated in FIG. 2 may be included as part of blocks 140 & 150 of FIG. 1. In this embodiment, blocks 140 & 150 may be implemented as an atomic action, such as, for example, a "compare-and-store" operation (a.k.a. a "test-and-set" operation) that confirms that a variable is equal to an expected value before changing the variable to be set to a new value.

FIG. 5 is a block diagram illustrating an embodiment of an apparatus 501 and a system 500 that allows for acquisition and release of a lock 510 in accordance with the disclosed subject matter. In one embodiment, the lock 510 may include a state value 520. The state value may include a flag value 523 to indicate whether or not the lock is currently held and/or the approximate length of a queue of threads 550 waiting to acquire the lock, a first thread value 525 to facilitate access to a first thread 560, and/or a last thread value 528 to facilitate access to a last thread 580.

In one embodiment, the system 500 may include a queue of threads 550 that are waiting to acquire the lock 510. While FIG. 5 illustrates a queue having at least four threads and queue having zero or more threads is within the scope of the disclosed subject matter. The queue may include a first thread 560, a last thread 580, a second thread 570, and a plurality of other threads 590. In one embodiment, for example if the queue includes only one thread, the first and last thread may be identical. In one embodiment, each thread in the queue may include a wait value 593 that indicates that the thread is waiting to acquire the lock, and/or a next thread value 597 that facilitates access to the next thread in the queue. However, it is contemplated that other state and memory structures may be utilized by the threads.

In one embodiment, the apparatus 501 and system 500 may include a lock acquirer 530 to facilitate acquiring the lock 510. In one embodiment, the lock acquirer may be capable of performing all or part of the technique illustrated by FIGS. 1 & 2 and described above. In another example, the lock acquirer may be capable of determining if the lock is held. If so, the lock acquirer may place a requesting thread within the queue 550. It is contemplated that the requesting thread may be placed at the end of the queue, or in the front or middle of the queue if a prioritized queue scheme is used. However, these are merely a few non-limiting examples of embodiments within the scope of the disclosed subject matter.

In one embodiment, the apparatus 501 and system 500 may include a lock releaser 540 to facilitate releasing the lock 510. In one embodiment, the lock releaser may be capable of performing all or part of the technique illustrated by FIGS. 1 & 2 and described above. In another example, the lock releaser may be capable of determining if a queue 550 exists or is empty. If the queue exists, the lock acquirer may remove the first thread 560 from the queue and move the second thread 570 to the first position in the queue. The lock releaser may then notify the first thread 560 that the lock is available. It is contemplated that, in one embodiment, the lock releaser may use the next thread value 597 to access the second thread and the wait value 593 to notify the first thread that the lock is available. However, these are merely a few non-limiting examples of embodiments within the scope of the disclosed subject matter.

In one embodiment, the apparatus 501 and system 500 may be capable of limiting the dynamic memory allocation and deallocations to a number substantially related or proportional to the sum of the number of locks, and the number of threads. It is further contemplated that alterations of the lock's state 520 or the thread's values 593 & 597 may be done via a technique that attempts to minimize the occurrence of race conditions and other undesirable thread related effects. In one embodiment, the alteration may be performed by a "compare-and-store" operation (a.k.a. a "test-and-set" operation) that confirms that a variable is equal to an expected value before allowing the variable to be set to a new value. It is also contemplated that a thread's wait value 593 and next thread value 597 may be stored within a memory and within separate cache lines of that memory. In another embodiment, the lock's queue length value 523 and last thread value 528 may be stored within the same cache line of a memory. The lock's first thread value 525 and a duplicate or shadowed version of the last thread value may be stored within a second memory cache line. However, these are merely a few specific embodiments of the disclosed subject matter and other embodiments are possible and contemplated.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact read only memory (CD-ROM), digital versatile disk (DVD), hard disk, firmware, non-volatile memory, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the disclosed subject matter have been illustrated and described herein, many modifications, substitutions, changes, and equivalents will now occur to those skilled in the art. It is, therefore, to be understood that the appended claims are intended to cover all such modifications and changes that fall within the true spirit of the disclosed subject matter.

What is claimed is:

1. A method of managing a lock utilized by a plurality of threads executing on a computing device to coordinate access to a shared resource, the method comprising:
    selecting by one of the threads, an action to be performed by the thread upon the lock, wherein the action is selected from a group comprising:
        acquiring the lock,
        trying to acquire the lock, and
        releasing the lock;
    asynchronously querying and receiving a first state of the lock as a current state of the lock by the thread, the lock being considered to be in any one of at least four states in any point in time, the states defined by a state machine associated with the lock;
    speculatively determining by the thread, a second state of the lock based at least in part on the first state and the selected action; and
    attempting to perform by the thread, the selected action to transition the lock from the first state to the speculatively determined second state, the attempting including determining if the first state remains the current state of the lock, and, if the first state remains the current state, performing the selected action to transition the current state of the lock to the second state.

2. The method of claim 1, further including, if the state transition fails and if the selected action was either acquiring or releasing the lock, repeating, until the state transition succeeds:
asynchronously querying the first state of the lock;
speculatively determining the second state of the lock;
attempting to transition the lock from the queried first state to the speculatively determined second state.

3. The method of claim 2, further including, if
the state transition succeeds,
the selected action is acquiring the lock, and
the speculatively determined second state represents the acquisition of the lock, indicating the acquisition of the lock.

4. The method of claim 3, further including, if
the state transition succeeds,
the selected action is acquiring the lock, and
the speculatively determined second state does not represent the acquisition of the lock, adding the thread to the end of a queue of threads waiting to acquire the lock; waiting to receive notification that the thread may acquire the lock; and indicating the acquisition of the lock.

5. The method of claim 2, further including, if
the state transition succeeds, and
the selected action is releasing the lock, determining the number of threads in a queue to acquire the lock utilizing the speculatively determined second state of the lock.

6. The method of claim 5, further including, if the queue includes at least a first thread,
removing the first thread from the queue; and
notifying the first thread that the first thread has acquired the lock.

7. The method of claim 1, further including, if
the selected action is trying to acquire the lock and
the state transition fails, indicating that the lock was unable to be acquired.

8. The method of claim 1, further including, if
the state transition succeeds and
the selected action is trying to acquire the lock, indicating the acquisition of the lock.

9. The method of claim 1, further including, if
the state transition succeeds,
the selected action is acquiring the lock, and
the speculatively determined second state represents the acquisition of the lock, indicating the acquisition of the lock.

10. The method of claim 9, further including, if
the state transition succeeds,
the selected action is acquiring the lock, and
the speculatively determined second state does not represent the acquisition of the lock, adding the thread to the end of a queue of threads waiting to acquire the lock; waiting to receive notification that the thread may acquire the lock; and indicating the acquisition of the lock.

11. The method of claim 1, further including, if
the state transition succeeds, and
the selected action is releasing the lock, determining the number of threads in a queue to acquire the lock utilizing the speculatively determined second state of the lock.

12. The method of claim 11, further including, if the queue includes at least a first thread,
removing the first thread from the queue; and
notifying the first thread that the first thread has acquired the lock.

13. The method of claim 1, wherein the thread includes:
a unique thread identifier;
a next thread field to facilitate access to the next thread in a queue of threads waiting to acquire the lock; and
the thread is only capable of waiting for a single lock at a time.

14. The method of claim 1, wherein the action of acquiring the lock includes the inability to timeout or fail to acquire the lock.

15. The method of claim 1, wherein the lock's current state may change between
asynchronously querying the first state of the lock; and
attempting to transition the lock from the queried first state to the speculatively determined second state.

16. The method of claim 1, wherein each of the first and second states is a selected one of:
the lock is not held and there no threads waiting to access the shared resource,
the lock is held and there are no threads waiting to access the shared resource,
the lock is held and there is one thread waiting to access the shared resource, and the lock is held and there are at least two threads waiting to access the shared resource.

17. An apparatus comprising:
a processor;
a storage medium coupled to the processor, and having stored therein programming instructions to be operated by the processor to implement a lock acquirer to acquire a lock, having a multi-part state value defined by a state machine associated with the lock; wherein the lock acquirer performs an acquisition of the lock via
asynchronously querying and receiving a first state of the lock as a current state of the lock, by the lock acquirer, the lock being considered to be in any one of at least four states in any point in time, and each state is represented by the multi-part state value;
speculatively determining by the lock acquirer, a second state of the lock based at least in part on the first state of the lock; and
attempting to perform, by the lock acquirer, the acquisition of the lock to transition the lock from the first state to the speculatively determined second state, the attempting including determining if the first state remains the current state of the lock, and, if the first state remains the current state, performing the acquisition to transition the current state of the lock to the second state.

18. The apparatus of claim 17, wherein the lock acquirer is further capable of performing two general actions, including acquiring the lock, trying to acquire the lock; and
wherein, if the state transition fails and the general action is acquiring the lock, the lock acquirer is further capable of, repeating, until the state transaction succeeds:
asynchronously querying the first state of the lock;
speculatively determining the second state of the lock; and
attempting to transition the lock from the queried first state to the speculatively determined second state.

19. The apparatus of claim 18, wherein, if the state transition fails and the general action is trying to acquire the lock, the lock acquirer is further capable of,
indicating that the lock was unable to be acquired.

20. The apparatus of claim 19, wherein, if the state transition succeeds and the general action is trying to acquire the lock, the lock acquirer is further capable of,
indicating that the lock was acquired.

21. The apparatus of claim 18, wherein, if
the state transition succeeds,
the general action is acquire the lock, and
the speculatively determined second state represents the acquisition of the lock, the lock acquirer is further capable of,
indicating that the lock was acquired.

22. The apparatus of claim 21, wherein, if
the state transition fails,
the general action is acquire the lock, and
the speculatively determined second state does not represent the acquisition of the lock, the lock acquirer is further capable of,
adding the thread to the end of a queue of threads waiting to acquire the lock;
waiting to receive notification that the thread may acquire the lock; and indicating the acquisition of the lock.

23. The apparatus of claim 22, wherein the lock acquirer is unable to timeout of fail if the selected general action is acquiring the lock.

24. An apparatus comprising:
a processor;
a storage medium coupled to the processor, and having stored therein programming instructions to be operated by the processor to implement a lock releaser to release a lock, the lock having a multi-part state value defined by a state machine associated with the lock;
wherein the lock releaser, release said hold on the lock via
asynchronously querying and receiving a first state of the lock as a current state of the lock, by the lock releaser, the lock being considered to be in any one of at least four states in any point in time, and each state is represented by the multi-part state value;
speculatively determining by the lock releaser, a second state of the lock based at least in part on the first state of the lock; and
attempting to perform, by the lock releaser, the releasing of the lock to transition the lock from the first state to the speculatively determined second state, the attempting including determining if the first state remains the current state of the lock, and, if the first state remains the current state, performing the releasing to transition the current state of the lock to the second state.

25. The apparatus of claim 24, wherein, if the state transition fails, the lock releaser is further capable of, repeating, until the state transaction succeeds:
asynchronously querying the first state of the lock;
speculatively determining the second state of the lock; and
attempting to transition the lock from the queried first state to the speculatively determined second state.

26. The apparatus of claim 24, wherein, if the state transition succeeds, the lock releaser is further capable of determining the number of threads in a queue of threads waiting to acquire the lock utilizing the speculatively determined second state of the lock.

27. The apparatus of claim 26, wherein, if the queue includes at least a first thread, the lock releaser is further capable of:
removing the first thread from the queue; and
notifying the first thread that the first thread has acquired the lock.

28. The apparatus of claim 27, wherein the lock releaser is capable of removing the first thread from the queue utilizing a thread having:
a unique thread identifier; and
a next thread value to facilitate access to the next thread in the queue.

29. The apparatus of claim 24, wherein the lock is capable of changing state in between the time the lock releaser
asynchronously queries the first state of the lock; and
attempts to transition the lock from the queried first state to the speculatively determined second state.

30. An article comprising:
a storage medium; and
a plurality of programming instructions stored on the storage medium and configured, when executed by a processor to coordinate access to a shared resource for a plurality of threads, by performing a method of:
selecting by one of the threads an action to be performed a thread upon a lock utilized by the thread, wherein the action is selected from a group comprising:
acquiring the lock,
trying to acquire the lock,
and releasing the lock;
asynchronously querying and receiving a first state of the lock as a current state of the lock, by the thread, the lock being considered to be in any one of at least four states in any point in time, and each state is represented by a multi-part state value defined by a state machine associated with the lock;
speculatively determining by the thread, a second state of the lock based at least in part on the first state of the lock and the selected action; and
attempting to perform by the thread, the selected action to transition the lock from the first state to the speculatively determined second state, the attempting including determining if the first state remains the current state of the lock, and, if the first state remains the current state, performing the selected action to transition the current state of the lock to the second state.

31. The article of claim 30, further including instructions providing for, if the state transition fails and if the selected action was either acquiring or releasing the lock, repeating, until the state transition succeeds:
asynchronously querying the first state of the lock;
speculatively determining the second state of the lock;
attempting to transition the lock from the queried first state to the speculatively determined second state.

32. The article of claim 31, further including instructions providing for, if
the state transition succeeds,
the selected action is acquiring the lock, and
the speculatively determined second state represents the acquisition of the lock, indicating the acquisition of the lock.

33. The article of claim 32, further including instructions providing for, if
the state transition succeeds,
the selected action is acquiring the lock, and
the speculatively determined second state does not represent the acquisition of the lock, adding the thread to the end of a queue of threads waiting to acquire the lock; waiting to receive notification that the thread may acquire the lock; and indicating the acquisition of the lock.

34. The article of claim 31, further including instructions providing for, if
the state transition succeeds, and the selected action is releasing the lock, determining the number of threads in a queue to acquire the lock utilizing the speculatively determined second state of the lock.

35. The article of claim 34, further including instructions providing for, if the queue includes at least a first thread,
removing the first thread from the queue; and
notifying the first thread that the first thread has acquired the lock.

36. The article of claim 30, further including instructions providing for, if
the selected action is trying to acquire the lock and
the state transition fails, indicating that the lock was unable to be acquired.

37. The article of claim 30, further including instructions providing for, if
the state transition succeeds and
the selected action is trying to acquire the lock, indicating the acquisition of the lock.

38. The article of claim 30, further including instructions providing for, if
the state transition succeeds,
the selected action is acquiring the lock, and
the speculatively determined second state represents the acquisition of the lock, indicating the acquisition of the lock.

39. The article of claim 38, further including instructions providing for, if
the state transition succeeds,
the selected action is acquiring the lock, and
the speculatively determined second state does not represent the acquisition of the lock, adding the thread to the end of a queue of threads waiting to acquire the lock;
waiting to receive notification that the thread may acquire the lock; and indicating the acquisition of the lock.

40. The article of claim 30, further including instructions providing for, if
the state transition succeeds, and
the selected action is releasing the lock, determining the number of threads in a queue to acquire the lock utilizing the speculatively determined second state of the lock.

41. The article of claim 40, further including instructions providing for, if the queue includes at least a first thread,
removing the first thread from the queue; and
notifying the first thread that the first thread has acquired the lock.

42. The article of claim 30, wherein the thread includes:
a unique thread identifier;
a next thread field to facilitate access to the next thread in a queue of threads waiting to acquire the lock; and
the thread is only capable of waiting for a single lock at a time.

43. The article of claim 30, wherein the action of acquiring the lock includes the inability to timeout or fail to acquire the lock.

44. The article of claim 30, wherein the lock's current state may change between
asynchronously querying the first state of the lock; and
attempting to transition the lock from the queried first state to the speculatively determined second state.

* * * * *

UNITED STATES PATENT AND TRADEMARK OFFICE
CERTIFICATE OF CORRECTION

PATENT NO. : 7,500,242 B2
APPLICATION NO. : 10/658626
DATED : March 3, 2009
INVENTOR(S) : Sanjiv M. Shah et al.

It is certified that error appears in the above-identified patent and that said Letters Patent is hereby corrected as shown below:

Column 9
At line 18, "the lock, indicating" should have a line break immediately after "the lock," and "indicating" should begin a new line immediately thereafter.
At line 24, "the lock, adding" should have a line break immediately after "the lock," and "adding" should begin a new line immediately thereafter.
At line 27, "the lock; and indicating" should have a line break immediately after "the lock; and" and "indicating" should begin a new line immediately thereafter.
At line 31, "the lock, determining" should have a line break immediately after "the lock," and "determining" should begin a new line immediately thereafter.
At line 41, "fails, indicating" should have a line break immediately after "fails," and "indicating" should begin a new line immediately thereafter.
At line 45, "the lock, indicating" should have a line break immediately after "the lock," and "indicating" should begin a new line immediately thereafter.
At line 51, "the lock, indicating" should have a line break immediately after "the lock," and "indicating" should begin a new line immediately thereafter.
At line 58, "the lock, adding" should have a line break immediately after "the lock," and "adding" should begin a new line immediately thereafter.
At line 61, "the lock; and indicating" should have a line break immediately after "the lock; and" and "indicating" should being a new line immediately thereafter.
At line 65, "the lock, determining" should have a line break immediately after "the lock," and "determining" should begin a new line immediately thereafter.

Column 10
At line 22, "there no threads" should read --there are no threads--.
At line 27, "resource, and the lock" should have a line break immediately after "resource, and" and "the lock" should begin a new line immediately thereafter.
At line 35, "the lock; wherein the lock" should have a line break immediately after "the lock;" and "wherein the lock" should begin a new line immediately thereafter.

Signed and Sealed this

Twelfth Day of October, 2010

David J. Kappos
*Director of the United States Patent and Trademark Office*

Column 11
At line 9, "the lock, the lock" should have a line break immediately after "the lock," and "the lock" should begin a new line immediately thereafter.
At line 16, "the lock, the lock" should have a line break immediately after "the lock," and "the lock" should begin a new line immediately thereafter.
At line 21, "the lock; and indicating" should have a line break immediately after "the lock; and" and "indicating" should begin a new line immediately thereafter.

Column 12
At lines 22-23, the line ending "the lock," should read --the lock, and--, and the line beginning "and releasing" should read --releasing--.
At line 53, "the lock, indicating" should have a line break immediately after "the lock," and "indicating" should begin a new line immediately thereafter.
At line 60, "the lock, adding" should have a line break immediately after "the lock," and "adding" should begin a new line immediately thereafter.
At line 63, "the lock; and indicating" should have a line break immediately after "the lock; and" and "indicating" should begin a new line immediately thereafter.

Column 13
At line 1, "the lock, determining" should have a line break immediately after "the lock," and "determining" should begin a new line immediately thereafter.
At line 12, "transition fails, indicating" should have a line break immediately after "transition fails" and "indicating" should begin a new line immediately thereafter.
At line 17, "the lock, indicating" should have a line break immediately after "the lock," and "indicating" should begin a new line immediately thereafter.
At line 24, "the lock, indicating" should have a line break immediately after "the lock," and "indicating" should begin a new line immediately thereafter.
At line 31, "the lock, adding" should have a line break immediately after "the lock," and "adding" should begin a new line immediately thereafter.

Column 14
At line 3, "the lock; and indicating" should have a line break immediately after "the lock; and" and "indicating" should begin a new line immediately thereafter.
At line 8, "the lock, determining" should have a line break immediately after "the lock," and "determining" should begin a new line immediately thereafter.